United States Patent [19]

Rülcker

[11] 3,926,216

[45] Dec. 16, 1975

[54] ARRANGEMENT OF CHECK VALVES

[75] Inventor: Carl-Edvard Jan Rülcker, Linkoping, Sweden

[73] Assignee: Saab-Scania Aktiebolag, Linkoping, Sweden

[22] Filed: June 6, 1974

[21] Appl. No.: 477,149

[30] Foreign Application Priority Data
June 8, 1973 Sweden .................. 7308107

[52] U.S. Cl. ................... 137/527.8; 251/303
[51] Int. Cl.² ........................... F16K 15/03
[58] Field of Search ..... 137/527, 527.8, 521, 527.4; 251/303, 288, 298

[56] References Cited
UNITED STATES PATENTS

| | | | |
|---|---|---|---|
| 2,356,815 | 8/1944 | Bischoff | 137/527 |
| 2,669,419 | 2/1954 | Young | 137/527.8 |
| 2,711,188 | 6/1955 | Nickerson | 137/527.8 |
| 2,763,287 | 9/1956 | Dopp et al. | 137/527.8 |
| 2,864,401 | 12/1958 | Carr | 137/527.8 |
| 3,395,727 | 8/1968 | Weise et al. | 137/527.8 |
| 3,504,700 | 4/1970 | Baker | 251/303 X |

FOREIGN PATENTS OR APPLICATIONS

| | | | |
|---|---|---|---|
| 786,999 | 9/1970 | France | 137/527 |

*Primary Examiner*—Irwin C. Cohen
*Assistant Examiner*—Robert J. Miller

[57] ABSTRACT

The annular body of a damper-type check valve has a mainly cylindrical inner surface that defines a fluid passage, but a ridge around it provides a valve seat that is inclined to the passage axis with its lower part forward in the direction of permitted fluid flow. The damper is dome-shaped, forwardly convex, and is swingable about a pivot axis which is parallel to its horizontal diameter but is spaced thereabove by about half its radius. A counterweight on the convex front face of the damper is concentrated near its geometrical center. A readily removable spring can provide supplemental closing bias on the damper.

15 Claims, 9 Drawing Figures

ARRANGEMENT OF CHECK VALVES

This invention relates to damper-type check valves, that is, to check valves in which a more or less disc-like valve closure member is mounted to swing toward and from its closed position about an eccentric pivot axis that extends across the closure member in spaced parallel relation to a diameter thereof; and the invention is more particularly concerned with improvements in such check valves whereby fast closing of the valve is assured when forward flow of fluid through the valve decreases to near zero velocity, and whereby other important advantages are obtained.

In a damper-type check valve, the movable valve element or closure member can be regarded as a damper, and it is so referred to herein.

Damper-type check valves are advantageous for many applications, owing to their inherent compactness, the ease with which they can be mounted, and various functional advantages including low resistance to forward fluid flow. Heretofore, however, such check valves have also possessed certain disadvantages.

In prior damper-type check valves the damper was made with a relatively heavy integral counterweight, on the theory that substantial weight was needed to obtain a gravity bias that would ensure prompt and tight closure of the damper. However, a heavy damper, subject to a large closing bias under the force of gravity, presents substantial resistance to flow of fluid through the valve. A heavy damper can also cause the valve structure to be subjected to high stresses upon opening, especially when the valve is used to control flow of steam or other compressible fluid that causes quick valve opening. When a heavy damper swings open rapidly, it acquires a large momentum and strikes hard against the stop that defines its open position, abruptly throwing large reaction forces onto its pivot bearings as well as onto that stop. In some cases heavy dampers thus caused breakage of check valve parts, and in all cases they entailed noisy operation and excessive wear.

Prior damper-type check valves were also characterized by a relatively slow closing action. If a check valve does not close very promptly when flow of a liquid in a forward direction begins to drop to near-zero velocity, a back pressure or flow reversal can develop in the liquid before the damper reaches its fully seated position, invariably causing a liquid hammer that is both annoying and potentially damaging to the liquid circulation system in which the valve is incorporated.

The present invention rests in part upon the discovery that slow closing of prior damper-type check valves was in large measure caused by the design of the damper itself, and particularly by the location of its counterweight at a substantial distance from the pivot axis about which the damper swung. The intention, in thus giving the counterweight a large moment arm, was to enable the counterweight to bias the damper towards its closed position with a large gravitational moment, but the applicant has found that because of this arrangement the damper had a large radius of gyration that prevented it from reacting quickly to a rapidly diminishing forward flow of fluid.

A damper-type check valve can be caused to have a faster closing action if a spring is arranged to react between the damper and the valve body to supplement the biasing force of gravity. Heretofore when the damper was spring biased, it was usual to house the coils of a pair of torsion springs in tubular spindles that served as trunnions or pivotal mountings for the damper, with opposite end portions of the springs projecting through the spindles to react between the damper and the valve body. This arrangement could not accommodate springs of sufficient size to have any real effect.

The present invention has as its general object the provision of a damper-type check valve that overcomes all of the above explained deficiencies of prior devices of that type. Hence it can also be said to be the general object of this invention to provide a damper-type check valve that does not present undue resistance to forward flow through it, can open in response to low forward pressure differentials, but nevertheless closes promptly, rapidly and firmly in response to flow conditions that warrant its closure, so that liquid hammer cannot develop.

It is another and more specific object of the invention to provide a rapidly acting check valve with a gravity biased damper that does not develop great momentum upon rapid opening thereof, and which is therefore quiet in operation and has a long useful life. In this connection it is also a specific object of the invention to provide a gravity biased damper for a check valve of the character described, which damper has a small radius of gyration and therefore has a prompt and rapid closing movement.

Another specific object of the invention is to provide a damper-type check valve that can accommodate a substantially large spring for biasing the damper towards its closed position, and wherein such a biasing spring can be installed or removed very quickly and easily as required to accommodate a particular installation, or can be readily replaced with a spring of different characteristics to accommodate different fluid flow conditions.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which.

Figure 1:
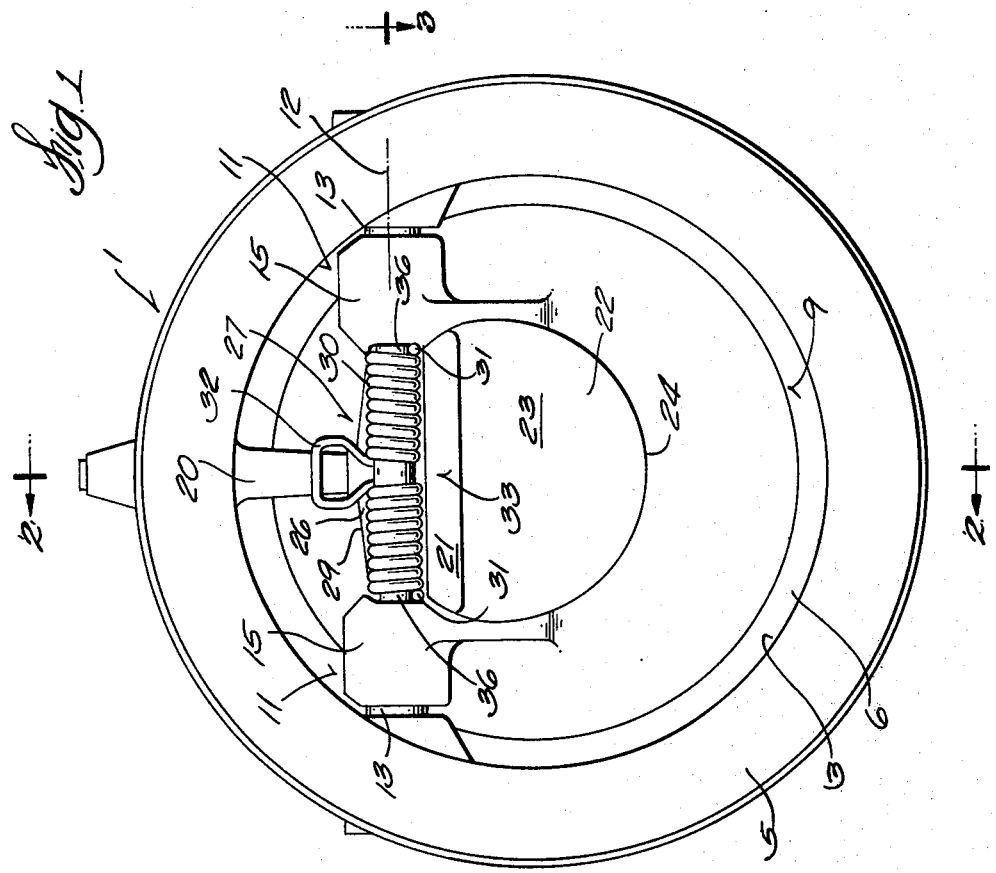
FIG. 1 is an end view of a check valve of this invention as seen from the forward or downstream side of the valve.

Referring now to the accompanying drawings, the numeral 1 designates the generally annular body of a check valve embodying the principles of the present invention, which valve body can be relatively short axially and has flat, parallel opposite end faces 2 that are normal to its axis 4. The inner surface 3 of the valve body 1, which defines a passage in which fluid normally flows through the valve, is cylindrical and concentric to the axis 4, but its cylindrical configuration is interrupted by a radially inwardly projecting ridge 6 that extends completely around it to provide a valve seat 8, as described hereinafter.

Figure 2:
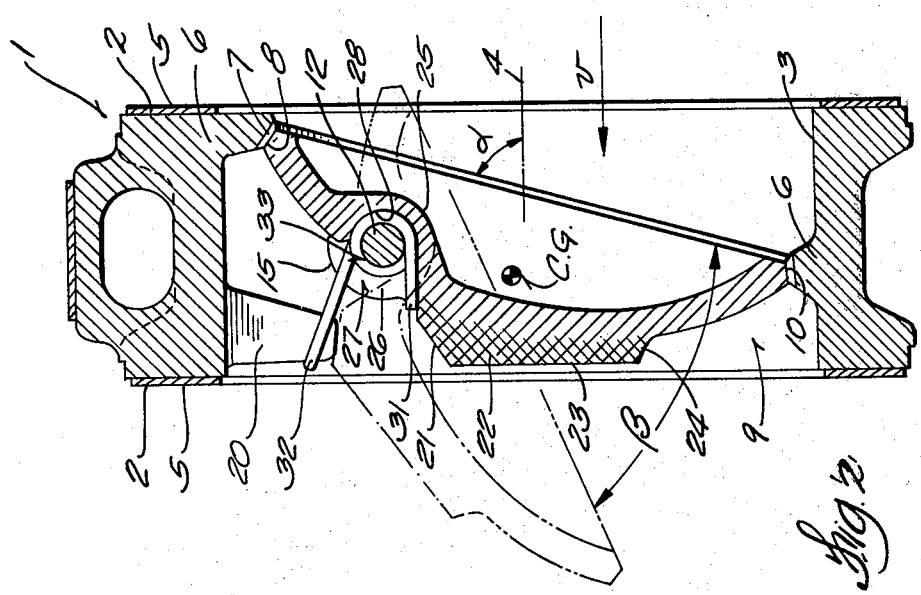
FIG. 2 is a view in longitudinal section taken on the plane of the line II—II in FIG. 1, which is the plane of symmetry of the valve.
Figure 3:
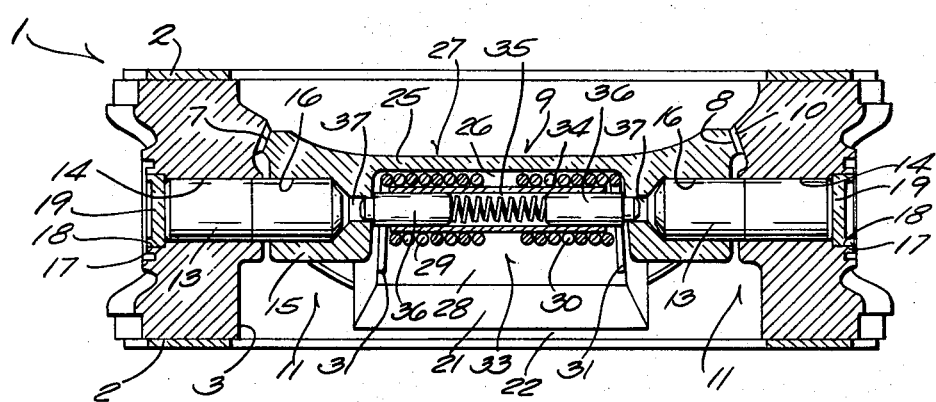
FIG. 3 is a sectional view taken on the plane of the line III—III in FIG. 1.

Inside the valve body is a movable closure member or damper 9 that is swingable about an axis 12 between a closed position in which the damper is shown in solid lines in FIG. 2 and a fully open position indicated in that figure by broken lines. Fluid flowing through the valve body, when flowing in a forward direction that is indicated by the arrow v in FIG. 2 and at normal flow velocities, exerts sufficient force upon the damper to overcome biasing forces which urge it towards its closed position. Such biasing forces are provided by a counterweight 22 on the damper and by a torsion spring 27 that reacts between the damper and the valve body.

The short axial length of the valve body and its flat end faces 2 enables the valve to be installed between opposing flanged ends of pipes (not shown) that have the same inside diameter as the valve body. The valve can be slid laterally into place between the flanges and clampingly secured by bolts (not shown) that extend through the two flanges and span the exterior surface of the valve body. To facilitate such installation, gasket-like packings 5 are adhesively bonded to the flat end faces 2 of the body, to be sealingly compressed against the flanges upon tightening of the bolts.

To best adapt the check valve for installations in which the direction of fluid flow is horizontal, the valve seat 8 lies in a plane that is at an acute angle $\alpha$ (FIG. 2) to the axis 4 of the body passage. The valve seat is circular about its own axis, but because the angle $\alpha$ between the passage axis and the plane of the valve seat is about 75° to 80°, the axis of the valve seat is inclined to the axis 4 of the passage at an angle on the order of 10° to 15°.

Such inclination of the valve seat does not detract from performance of the valve in a vertical installation, and therefore it can be adopted as a standardized feature for valves of this invention intended for universal application.

Where a damper type check valve is to be so installed that fluid flows vertically through it, the forward direction of fluid flow must be upward for proper operation of the valve.

The land or rib 6 in which the valve seat is formed is preferably provided with a liner ring 7 of a metal which is harder than the rest of the valve body and more resistant to wear. The ring 7 is accurately machined to provide it with the radially inner sealing surface 8 that forms the valve seat proper. To enable the damper 9 to swing through the plane of the valve seat, notwithstanding the forward spacing of its pivot axis 12 from that plane, the valve seat surface 8 is conical and divergent in the forward direction of fluid flow, its cone angle being on the order of 20°.

The damper 9 is in essence a circular disc, and could be made substantially flat in the case of a small valve, but for strength, especially in a large valve, it is made dome shaped or spherically dished, with its convex surface forward, that is, facing in the direction of permitted fluid flow. Except for bearing bosses 15, an integral counterweight portion 22 and a portion that defines a spring receiving groove 28, all parts of the damper wall are of uniform thickness. The damper has a conical peripheral surface 10 that is accurately machined to sealingly mate with the seat surface 8 of the liner ring 7.

The bearing bosses 15, which are preferably integral with the body of the damper, are located near its periphery and have coaxial outwardly opening bearing wells 16 in which are received sturdy spindles or trunnion pins 13 that have their outer end portions seated in coaxial bores 14 in the valve body. The trunnion pins 13 of course cooperate with the bearing wells 16 to mount the damper for swinging about the pivot axis 12.

To seal the mouths of the bores 14 in the valve body, a plug-like element 19 is fitted into the outer end portion of each of those bores. Each plug element 19 has a circumferential axially outwardly projecting flange or rim 18 that lies radially contiguous to a concentric ring 17 around the mouth of the bore 14, the ring 17 being integral with the valve body. The rim 18 and the ring 17 are welded together all around them.

In a damper-type check valve the trunnion pins and their bearings must be accurately coaxial since it is essential to proper operation of the valve that the damper be movable towards and from its closed position without any binding or wedging in its bearings, and without any radial play in them. It is also essential that the damper be able to tip directly into its conical seat until it is in complete contact with the seat all around the same, without premature contact occurring at only one point on the seat.

The pivot axis 12 extends parallel to the plane of the valve seat 8 and is spaced forwardly from it. With the valve body so oriented that its axis 4 and the damper pivot axis 12 are both horizontal, the pivot axis is spaced above the valve body axis. For the damper to be most effectively acted upon by fluid flowing through the body as well as by its own weight, it has been found that the distance between those two axes should be about one-half the radius of the damper.

In determining the position of the axis 12, consideration must also be given to the cone angle of the sealing surfaces 8 and 10, so that the geometry of damper movement will allow those sealing surfaces to separate when the damper swings open. To this end, the axis 12 must be within the upper wedge-shaped space that would be defined in the plane of symmetry of FIG. 2 by two lines normal to the sealing surface 8, one drawn from the upper forward point of contact of that surface with the mating damper surface 10, the other drawn from the lower rearward point of such contact. With a cone angle of 20° for the sealing surfaces, the preferred location for the axis 12, as so determined, is such that said axis passes through the wall of the damper, between its front and rear surfaces, when the damper is of purely spherical basic form as shown.

The counterweight 22 is preferably formed integrally with the damper, as a thickening of its wall that provides a forward projection on it, as denoted by cross-hatching in FIG. 2. If the practices of the prior art were followed, the counterweight would be located as close as possible to the bottom of the damper, to afford the longest possible moment arm for it. According to the present invention, however, it is located near the geometrical center of the damper, so that with the valve body axis 4 oriented horizontally, the center of gravity (C.G.) of the damper is located near said axis 4 and a distance forward of the pivot axis 12.

As indicated above, if forward flow of fluid through the valve undergoes an abrupt reduction in velocity, the damper should move to its closed position as quickly as possible so that it is fully closed as soon as the flow velocity goes to zero. To understand why the location and concentration of the counterweight at the geometrical center of the damper contributes to the desired rapid closure of the valve, assume first that fluid is flowing through the valve at a velocity just sufficient to hold the damper in its fully open position, and that the damper is biased towards its closed position only by gravity. The following relationship will then exist:

$$M_{grav} - M_{dyn} - M_{fric} = J \cdot \ddot{\phi}$$

where $M_{grav}$ is the moment of gravitational force, $M_{dyn}$ is the dynamic moment acting upon the damper in the opening direction, $M_{fric}$ is the moment of bearing friction, $J$ is the moment of inertia of the damper, and $\ddot{\phi}$ is the angular acceleration of the damper in the closing direction.

As long as fluid flows in the forward direction, only the moment of gravitational force tends to close the damper, and its closing is resisted by the other two moments. The equation also shows that for the damper to begin moving in the closing direction promptly upon a substantial decrease in forward flow velocity, but while the fluid still has some forward velocity, there should be a substantial amount of gravitational force acting upon it. The value of the gravitational moment is necessarily limited, and an instantaneous change in the swinging velocity of the damper is of course impossible, but the damper should be so accelerated as to give it the greatest possible angular velocity before the direction of flow reverses.

For the dynamic moment:

$$M_{dyn} = f(V^2),$$

and it will be appreciated that this moment has insignificant effect in retarding closing movement of the damper as fluid flow velocity approaches zero. It follows that in order to obtain a high value of the product $J \cdot \ddot{\phi}$, $M_{grav}$ must be made large enough so that $M_{fric}$ becomes negligible by comparison with it.

With the flow velocity near zero, it can be said that in practical effect $$M_{grav} = J \cdot \ddot{\phi}$$

and it is required for rapid damper closure that $\ddot{\phi}$ be given the largest possible value. It can readily be shown that $$\ddot{\phi} = f(r/R^2)$$

where $r$ is the distance from the center of gravity (CG) of the damper to its pivot axis 12, and $R$ is the radius of gyration of the damper.

From this last relationship it is apparent that once the closing movement of the damper has started, its mass is without significance to its acceleration and hence also to the time required for it to reach its closed position. Instead, the distribution of the mass of the damper relative to its pivot axis appears as the decisive factor for its total closing time.

As compared with the damper of a prior valve, having a substantial mass that was mainly concentrated at a substantial distance from its pivot axis, the damper of the present invention has a smaller distance $r$ between its center of gravity and its pivot axis but its radius of gyration $R$ is also correspondingly smaller and since the radius of gyration $R$ is effective quadratically, as compared with the linear effect of $r$, the damper of the present invention has a higher angular acceleration and hence a shorter closing time than the heretofore conventional damper.

If the damper were to have a substantially uniform wall thickness across its entire area, its center of gravity would be in nearly the same location as when it has the counterweight of this invention, but the relationship between the radii $r$ and $R$ would then be unfavorable, and more important, the moment of gravitational force would be smaller than with the additional counterweight mass concentrated near the geometrical center of the damper, as here contemplated.

Thus without the counterweight the gravitational moment would be too small to satisfactorily overcome bearing friction while there was still some forward flow of fluid through the valve, and the damper would not start its closing movement in time to prevent flow reversal.

The counterweight 22 projects forwardly from the rest of the damper in order to ensure that the center of gravity of the damper will always be forward of the pivot axis 12; but when the damper is in its closed position, the forward surface 23 of the counterweight should lie wholly inside the plane of the adjacent end face 2 of the valve body so that the valve can be slid laterally into and out of its installed position between substantially fixed pipe flanges.

Of course the mass of the counterweight 22 should be entirely below the pivot axis 12 when the damper is closed and the valve body is oriented with its axis 4 horizontal. However, the mass of the counterweight must be approximately equally great on both sides of the geometrical axis of the damper, which is close to the passage axis 4; and therefore the bottom limit 24 of the counterweight is at a level approximately halfway between the axis 4 and the very bottom of the damper. By forming as much as possible of the damper with uniform wall thickness and with a spherically dished shape, a favorable distribution of its weight is obtained so that by reason of the presence of the counterweight 22, the radius $r$ of the damper center of gravity about the pivot axis 12 is not appreciably altered but its radius of gyration $R$ is appreciably shortened and is thus brought into a favorable relationship to the radius of its center of gravity. At the same time, the mass of the counterweight is limited, so as to be no greater than is necessary to overcome the friction in the bearings when the damper is in its open position and its total mass acts through a lever arm which is the horizontal projection of the radius $r$.

As mentioned above, and as can be seen from FIG. 2, concentration of the counterweight mass entirely adjacent to the forward face of the damper contributes to some extent to establishing the center of gravity of the damper as a whole at a location forward of the pivot axis 12 when the damper is in its closed position, so that the weight of the damper exerts a torque force (a positive value of $M_{grav}$) that tends to maintain it seated and prevents leakage between the sealing surfaces 8 and 10. Also contributing importantly to this favorable position of the center of gravity when the valve is oriented with its axis 4 horizontal is the inclination of the valve seat at an angle $\alpha < 90°$.

The fully open position of the damper is defined by a tongue 20 which projects radially downwardly into the fluid passage from the top of the valve body and which is engaged by an oblique, forwardly and downwardly inclined abutment surface 21 on the counterweight. It will be noted that the damper is not exactly aligned with the flow when in its fully open position but instead is inclined forwardly and downwardly in the flow direction. The damper will have a faster closing time if the angle β through which it swings between its fully open and fully closed positions is thus kept somewhat smaller than the angle α, especially in cases where the valve is installed in a vertical line.

In many applications the spring 27 that biases the damper to its closed position is not necessary, inasmuch as the damper, by reason of its favorable weight distribution, has been found to fulfill its closing function much more satisfactorily than the closure members of prior damper-type valves. In some situations, however, external system factors that affect the dynamics of the damper are such that its closing time would still be too long with only gravity bias. This is particularly true where the fluid to be controlled is a liquid and appreciable back pressure prevails downstream from the valve. In such cases, especially if the dynamic moment due to normal forward flow velocity is more than sufficient to counterbalance the gravitational moment, the spring force cooperates with the gravitational moment to cause closing movement to start earlier in response to any reduction of the dynamic moment, and causes the continuing closing motion to take place more rapidly than it would in the absence of the spring. The spring thus has the same positive effect on closing operation as would be obtained by increasing the gravitational moment, but it does not produce the negative effects of such an increase that relate to unfavorable moment of inertia and imposition of shock forces upon the valve parts in consequence of rapid opening.

Since the spring is not necessary or desirable in all installations, the structure of the valve of this invention is so arranged that the spring can be readily installed and removed; hence such valves can be manufactured and stocked as standardized units, to be equipped with a spring or not, as occasion demands.

When a spring is used, the moment developed by the spring must be accurately balanced in relation to other moments acting upon the damper in order to satisfy the requirement for fast valve closure without interfering with the ability of the valve to open in response to small pressure differentials in the direction of forward flow of fluid.

Because of the ease with which the spring can be installed and removed, it is practical to equip any particular valve with the exact spring that best suits the requirements of the installation in which it is incorporated, and even to determine the required spring parameters — initial stress, spring constant, etc. — by trial and error experiment.

The damper is formed with a forwardly opening groove 28 in which the spring 27 is received and which extends lengthwise from one to the other of the bosses 15. As best seen in FIG. 2, the portion of the wall of the damper that defines the groove 28 departs from the spherical configuration of most of the rest of the damper wall. The inner or forwardly facing surface of the groove is rounded on a uniform radius about the pivot axis 12 and at its bottom blends into a ledge-like horizontal surface on the top of the counterweight.

The spring 27 is formed from a single length of spring wire that has its medial portion bent to a loop-like or U-shaped central leg 32. At each side of that leg and integral with it are coaxial coils 29 and 30 that are wound in opposite directions. The straight end portions of the spring wire provide outer legs 31 that project radially from the remote ends of the coils. The loop or U-shaped leg 32 is hooked around the tongue or stop abutment 20 on the valve body while the outer legs 29 and 30 of the spring lengthwise overlie the ledge-like horizontal surface at the top of the counterweight. The spring legs 31 and 32 are of course maintained under torsional bias by the coils 29 and 30, in the direction to urge the valve element towards its seated position.

A tube 33, of a length to fit between the opposing inner faces of the bosses 15, extends through the coils of the spring. Inside the tube 33 is a coiled expansion spring 35 that reacts between a pair of retainer pins 36 which are axially slidable in the opposite end portions of the tube. Each of the retainer pins has a reduced diameter outer end portion that is received in an inwardly opening bore 37 in its adjacent boss 15 when the spring assembly is in place. The junction of the coaxial larger and smaller diameter portions of each retainer pin 36 defines an axially outwardly facing circumferential shoulder, and the expansion spring 35, in biasing the retainer pins axially apart, holds their shoulders engaged against the opposing inner faces of the bosses 15 to confine those pins in the bores 37.

It will be apparent that the spring assembly can be readily installed or removed by axially converging the retainer pins 36 against the force of the spring 35, to bring the retainer pins to positions in which their outer ends are flush with the ends of the tube 34. Note that as the spring assembly is pushed laterally into the groove in the damper during the course of its installation, to bring the retainer pins 36 into alignment with the holes 37, the looped leg 32 of the spring almost automatically engages itself with the tongue 20 while the outer legs 31 take the proper position on the ledge-like surface that they engage, and such installation thus preloads the spring so that it maintains bias upon the damper even in its closed position.

From the foregoing description taken with the accompanying drawings it will be apparent that this invention provides a damper-type check valve which possesses all of the advantages of prior such valves but which, in addition, has a more responsive and faster acting damper and is therefore capable of use in many applications for which prior damper-type check valves were unsuitable.

Those skilled in the art will appreciate that the invention can be embodied in forms other than as herein disclosed for purposes of illustration.

The invention is defined by the following claims:

I claim:

1. A damper-type check valve of the type comprising a valve body that defines a passage through which fluid is intended to flow in a forward axial direction and around which passage there is an annular valve seat, and a damper in said body having a peripheral surface that is sealingly engageable with the seat in a closed position of the damper, said damper being swingable to and from said closed position about a pivot axis that extends parallel to the plane of said valve seat, is spaced in the forward direction from said plane and is spaced above the axis of the passage when the valve is oriented with said axes horizontal, said damper being biased by gravity towards its closed position and being urged away from its closed position by the force of fluid flowing in said forward direction, said check valve being characterized by:

A. the pivot axis about which the damper swings being spaced above the axis of the passage by a distance substantially less than the radius of the valve seat; and B. the damper having a counterweight which comprises a projection on its forward face and which is wholly located in a zone near the passage axis and is substantially centered on that axis so that the center of gravity of the damper is near the geometrical center thereof and a substantial part of its mass is at a comparatively small distance from the pivot axis, to provide the damper with a small radius of gyration that assures fast movement of it to its closed position when the velocity of fluid flow in the forward direction diminishes rapidly.

2. The check valve of claim 1, further characterized by:
  1. the damper being dished to substantially a dome shape with its convex surface facing in the forward direction; and
  2. the damper being provided with a pair of bosses in which trunnions are received that journal the damper for swinging movement about said pivot axis, said bosses projecting from the forward face of the valve element, near its periphery, and being axially spaced from one another.

3. The check valve of claim 2, further characterized by:
  1. the valve body having a tongue-like protuberance projecting radially into said passage, spaced in the forward direction from the pivot axis;
  2. the counterweight having an abutment surface near its top which is engageable with said protuberance to define the fully open position of the valve element;
  3. the damper having in its forward face a forwardly opening spring receiving groove that extends lengthwise between said bosses,
    a. said groove having a bottom surface curved concentrically around the pivot axis and
    b. said groove being directly above the counterweight; and
  4. a torsion spring having
    a. coils received in said groove and encircling an elongated member confined between said bosses in substantially concentric relation to the pivot axis,
    b. an arm projecting radially from said coils and engaging the counterweight and
    c. another arm projecting radially from said coils and engaging the tongue,
  the coils of said spring torsionally biasing said arms in opposite directions such that the spring reacts between the valve body and the damper to bias the latter towards its closed position.

4. The check valve of claim 3 wherein said elongated member that is encircled by the coils of the spring comprises
  1. a tube of a length to extend between said bosses;
  2. a coiled expansion spring received within said tube;
  3. a pair of pins, one for each end of the tube, each having a larger diameter portion slidingly received in its end portion of the tube and a coaxial smaller diameter portion axially receivable in a closely fitting hole in its adjacent boss, said holes in the bosses being coaxial with one another,
  said compression spring biasing the pins apart to maintain them releasably engaged in their holes in the bosses and thus provide for optional installation and removal of the elongated member and the spring.

5. The check valve of claim 2, further characterized by:
  1. the valve seat being in a plane that is oblique to the axis of said passage, with the lower portion of the valve seat spaced in said forward direction relative to its upper portion, and
  2. the pivot axis being substantially over the bottom portion of the valve seat.

6. The check valve of claim 5, wherein said valve seat and the damper have mating frusto-conical sealing surfaces that diverge forwardly.

7. The check valve of claim 5, further characterized by:
  the valve body having a tongue-like protuberance projecting radially into said passage, spaced in the forward direction from the pivot axis and cooperable with a surface on the damper to define the fully open position of the damper, said tongue and surface being so arranged that the angle through which the damper can swing between its closed position and said fully open position is not larger than the acute angle between the axis of the passage and the plane of the valve seat.

8. The check valve of claim 1 wherein the distance between the geometrical center of the damper and said pivot axis is on the order of one-half the radius of the damper.

9. A damper type check valve of the type comprising a valve body that defines a passage through which fluid is intended to flow in a forward axial direction and around which passage there is an annular valve seat, and a damper in said body having a peripheral surface that is sealingly engageable with the seat in a closed position of the damper, said damper being swingable to and from said closed position about a pivot axis that extends parallel to the plane of said valve seat, is spaced in the forward direction from said plane and is spaced above the axis of the passage when the valve is oriented with said axes horizontal, said damper being biased towards its closed position and being urged away from said position by the force of fluid flowing in said forward direction, said check valve being characterized by:
  the damper being generally dome-shaped, with a wall of arcuate cross-section, but
  1. having on its surface that faces in said forward direction a pair of spaced apart bosses, each having axially oppositely opening inner and outer holes, all of said holes being coaxial and having their axis spaced from and parallel to a diametral line through the damper, the outer holes in the two bosses receiving pins which are secured in the valve body coaxially with said pivot axis and about which the damper is swingable, the inner holes in the bosses opening towards one another to receive end portions of an elongated spring retainer that can extend between the bosses; and
  2. a portion of the wall of the damper, between the bosses, being curved on a substantially uniform radius about the axis of said holes to define a groove which opens in said forward direction and in which can be received a damper biasing spring having coils that encircle an elongated spring retainer, and which spring has oppositely biased legs projecting substantially radially from its coils and respectively bearing against the damper and the valve body to cooperate with gravity in biasing the damper towards its closed position.

10. The check valve of claim 9, further characterized by:
an elongated member to be encircled by the coils of a damper biasing spring, for holding the same in place in said groove, said elongated member comprising
1. a tube of a length to extend between the bosses;
2. a coiled expansion spring received within the tube; and
3. a pair of pins, one for each end portion of the tube, each pin having a larger diameter portion slidingly received in its end portion of the tube and a coaxial smaller diameter portion axially receivable in the inner hole in its adjacent boss, said compression spring biasing the pins apart to maintain them releasably engaged in the inner holes in the bosses and thus provide for optional installation and removal of the elongated member and a damper biasing spring that has its coils embracing the same.

11. The check valve of claim 10, further characterized by:
1. the valve body having a tongue-like protuberance projecting radially into said passage, spaced in the forward direction from the pivot axis and providing an abutment engageable by the damper to define a fully open position thereof; and
2. a torsion spring formed from one piece of resilient wire to have
   a. two sets of coils encircling said tube,
   b. its medial portion formed as a substantially U-shaped leg that projects substantially radially from between said sets of coils and which is engaged with said protuberance to react against the same, and
   c. its end portions formed as legs that overlie and react against the damper to urge the same towards its closed position.

12. A damper type check valve of the type comprising a valve body that defines a passage through which fluid is intended to flow in a forward axial direction and around which passage there is an annular valve seat, and a damper in said body that is swingable about a horizontal pivot axis toward and from a closed position towards which the damper is gravity biased and in which a peripheral surface on the damper is sealingly engageable with the valve seat, said pivot axis being parallel to the plane of the valve seat, spaced forwardly therefrom, and spaced to one side of the passage axis by a distance substantially less than the radius of the valve seat, the damper of said check valve being characterized by:
a counterweight which comprises a projection on the forward face of the damper and effectively forms a substantially thick portion of the damper that is wholly located in a zone near the passage axis and is substantially centered on that axis, the damper being substantially thinner in its portions that extend radially outwardly from the counterweight in both directions transverse to the pivot axis so that the center of gravity of the damper is near its geometrical center and a substantially large portion of its mass is at a comparatively small distance from the pivot axis to provide the damper with a small radius of gyration that enables it to have rapid gravity-biased movement towards its closed position when the velocity of fluid flow in the forward direction diminishes rapidly.

13. A damper type check valve of the type comprising a valve body that defines a passage through which fluid is intended to flow in a forward axial direction and around which passage there is an annular valve seat, and a damper in said body having a peripheral surface that is sealingly engageable with the seat in a closed position of the damper, said damper being swingable to and from said closed position about a pivot axis which extends parallel to the plane of said valve seat and is spaced in the forward direction therefrom and which is spaced to one side of the axis of said passage by a distance substantially less than the radius of the valve seat, said damper being biased towards its closed position and being urged away from that position by the force of fluid flowing in said forward direction, said check valve being characterized by:
A. the damper being generally dome-shaped, with a forwardly convex wall of arcuate cross-section, but
   1. having on its surface that faces in said forward direction a pair of spaced apart bosses which have opposing inner faces and which accommodate coaxial pins that project outwardly from the bosses and into the valve body to mount the damper for its swinging motion, and
   2. a portion of the wall of the damper, between the bosses, being curved on a substantially uniform radius about the axis of said pins to define a groove which opens in said forward direction and in which can be received coils of a coiled torsion spring;
B. a coiled torsion spring having coaxial coils receivable in said groove and having oppositely biased legs which project substantially radially and which can respectively bear against the damper and the valve body for biasing the damper towards its closed position, said spring being of such length along the axis of its coils as to be confined against axial displacement by said opposing inner faces of the bosses; and
C. means providing a releasable connection between said bosses and coils of said spring whereby the spring is normally confined in said groove and against radial displacement so that it is effective to bias the damper towards its closed position but is readily removable so that gravity can be solely relied upon for biasing the damper.

14. The check valve of claim 13, further characterized by:
D. a counterweight on said damper for gravity bias of the same towards its closed position, said counterweight comprising a substantially thick part of the damper that defines a projection from its said surface that extends in said forward direction, said counterweight
   1. being substantially centered on the passage axis and
   2. being wholly located in a zone near the passage axis
   so that the center of gravity of the damper is near its geometrical center and a substantially large portion of its mass is at a comparatively small distance from the pivot axis to provide the damper with a small radius of gyration that enables it to have rapid movement towards its closed position when the velocity of fluid flow in said forward direction diminishes rapidly.

15. The check valve of claim 14 wherein the valve body has an axial length which is substantially less than its diameter and has its ends lying in parallel planes normal to its passage axis, and wherein the plane of said valve seat is inclined to the passage axis, one portion of the valve seat being near one end of the body, its diametrically opposite portion being between said ends, and the pivot axis being nearer the first mentioned portion of said valve seat, further characterized by:

said counterweight projecting in said forward direction only so far that when the damper is in its closed position the damper and counterweight lie wholly between said parallel planes to enable the valve body to be inserted between connecting ducts by motion parallel to said parallel planes.

* * * * *